(12) United States Patent
Staheli et al.

(10) Patent No.: US 7,967,333 B2
(45) Date of Patent: Jun. 28, 2011

(54) INFLATOR WITH IGNITION DISTRIBUTION

(75) Inventors: Clint Staheli, Brigham City, UT (US);
Bradley W Smith, Plain City, UT (US);
David Parkinson, Ogden, UT (US);
Brett Hussey, Bountiful, UT (US)

(73) Assignee: Autoliv ASP, Inc., Ogden, UT (US)

( * ) Notice: Subject to any disclaimer, the term of this patent is extended or adjusted under 35 U.S.C. 154(b) by 191 days.

(21) Appl. No.: 12/255,379

(22) Filed: Oct. 21, 2008

(65) Prior Publication Data
US 2010/0096844 A1 Apr. 22, 2010

(51) Int. Cl.
*B60R 21/26* (2011.01)
(52) U.S. Cl. .................................. 280/741; 280/737
(58) Field of Classification Search .................. 280/741, 280/737
See application file for complete search history.

(56) References Cited

U.S. PATENT DOCUMENTS

| | | | |
|---|---|---|---|
| 5,533,751 A * | 7/1996 | Kort et al. ............... | 280/737 |
| 5,626,360 A * | 5/1997 | Lauritzen et al. ......... | 280/741 |
| 5,772,243 A | 6/1998 | Green et al. | |
| 6,244,623 B1 * | 6/2001 | Moore et al. ............. | 280/737 |
| 6,718,884 B1 | 4/2004 | Yabuta et al. | |
| 6,789,485 B2 * | 9/2004 | Moquin et al. ............ | 102/530 |
| 6,908,104 B2 * | 6/2005 | Canterberry et al. ....... | 280/736 |
| 7,210,703 B2 | 5/2007 | Young et al. ............. | 280/741 |
| 2003/0034641 A1 * | 2/2003 | Zimbrich et al. .......... | 280/741 |
| 2003/0160438 A1 | 8/2003 | Quioc et al. | |
| 2004/0222620 A1 | 11/2004 | Wang et al. | |
| 2007/0296190 A1 | 12/2007 | Hussey et al. ............ | 280/741 |
| 2008/0061540 A1 * | 3/2008 | Smith et al. ............. | 280/736 |

OTHER PUBLICATIONS

International Search Report for International Application No. PCT/US2009/053726, mailed Sep. 29, 2009.

* cited by examiner

*Primary Examiner* — Paul N Dickson
*Assistant Examiner* — Drew Brown
(74) *Attorney, Agent, or Firm* — Harness, Dickey & Pierce, P.L.C.

(57) ABSTRACT

An inflator includes a housing and a gas generant disposed in the housing for creating a source of inflation gas. An initiator is disposed in the housing for producing a source of energy to ignite the gas generant. A distributor is disposed between the initiator and the gas generant. The distributor defines at least two distinct flow paths for distributing the source of energy to the gas generant.

13 Claims, 4 Drawing Sheets

INFLATOR WITH IGNITION DISTRIBUTION

FIELD

The present disclosure generally relates to airbags. More particularly, the present disclosure relates to an airbag with an ignition distributor for distributing the ignition energy from a single initiator to various surfaces of a gas generant.

BACKGROUND

The statements in this section merely provide background information related to the present disclosure and may not constitute prior art.

Inflatable safety restraint devices, or airbags can be found on most new vehicles. A vehicle can include an inflatable curtain airbag, for example. The inflatable curtain airbag can be deployed from a headliner of the vehicle, and can inflate to protect the head of the occupant(s) from contact with the side of the vehicle, such as the windows.

Airbags can typically include an inflator that can be connected to the one or more airbags positioned within the vehicle. The inflator can rapidly produce a quantity of inflation fluid or gas that can fill the airbag to protect the occupant (s). A typical inflator generally includes a gas generant for generating the inflation gas and an igniter system for producing a source of energy to ignite the gas generant. The igniter system can include multiple reactive charges for igniting the gas generant, depending on the particular application.

While known ignition systems may have proven satisfactory for their intended applications, a continuous need for improvement in the pertinent art remains. For example, it may be desirable to more efficiently direct the ignition energy from a single reactive charge to the gas generant.

SUMMARY

In accordance with one aspect, the present teachings provide an inflator for an airbag. The inflator includes a housing and a gas generant disposed in the housing for producing a source of inflation gas. An initiator is disposed in the housing for producing a source of energy to ignite the gas generant. A distributor is disposed between the initiator and the gas generant. The distributor defines at least two distinct flow paths for distributing the source of energy to the gas generant.

In accordance with another aspect, the present teachings provide an inflator for delivering a source of inflation gas to a side airbag of a motor vehicle. The inflator includes an elongated housing having a generally cylindrical cross section. A gas generant for producing the source of inflation gas includes first and second generally planar sides and an opening extending therethrough. An initiator is disposed in the housing for producing a source of energy to ignite the gas generant. A distributor is disposed between the initiator and the gas generant. The distributor includes a main opening for directing the source of energy to the opening of the gas generant and at least one secondary opening for directing the source of energy to one of the first and second planar sides of the gas generant, or to internal or external surfaces of the gas generant.

In accordance with a further aspect, the present teachings provide an inflator for an airbag of a motor vehicle. The inflator includes a housing and a gas generant for producing a source of inflation gas. The gas generant is disposed in the housing in a predetermined orientation. An initiator is disposed in the housing for producing a source of energy to ignite the gas generant. A distributor is disposed between the initiator and the gas generant. The distributor defines at least first and second distinct flow paths for distributing the source of energy to the gas generant. The first distinct flow path is oriented relative to the gas generant to direct the source of energy to a first surface of the gas generant. The second distinct flow path is oriented relative to the gas generant to direct the source of energy to a second surface of the gas generant.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION OF VARIOUS ASPECTS

Figure 1:
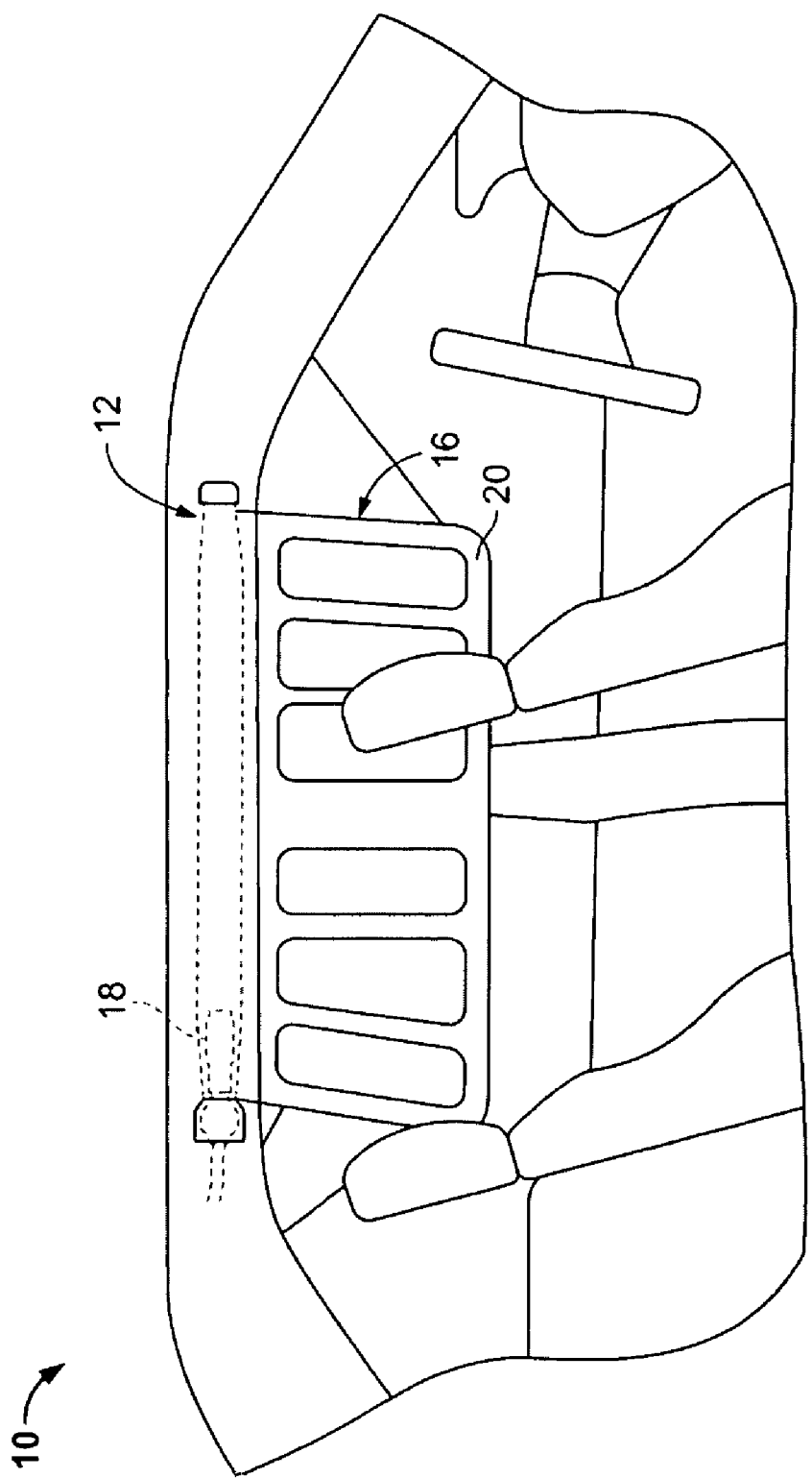
FIG. 1 is an environmental view illustrating a side airbag system including an inflator in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

With initial reference to FIG. 1, a portion of an exemplary motor vehicle 10 including an airbag system 12 in accordance with the present teachings is illustrated. The airbag system 12 can include one or more airbags 16 and an inflator 18. As various airbags 16 known in the art could be employed with the inflator 18, such as a front impact airbag, a knee bolster, an inflatable curtain, or an overhead airbag, the airbag 16 will not be discussed in great detail herein. Briefly, however, with reference to FIG. 1, the airbag 16 may include a cushion 20, which can be stored within a trim panel of the motor vehicle 10. In this example, the airbag 16 is a side impact inflatable curtain airbag, which when inflated by the inflator 18 occupies a large volume of a passenger cabin in the motor vehicle 10 as illustrated in FIG. 1.

Figure 2:
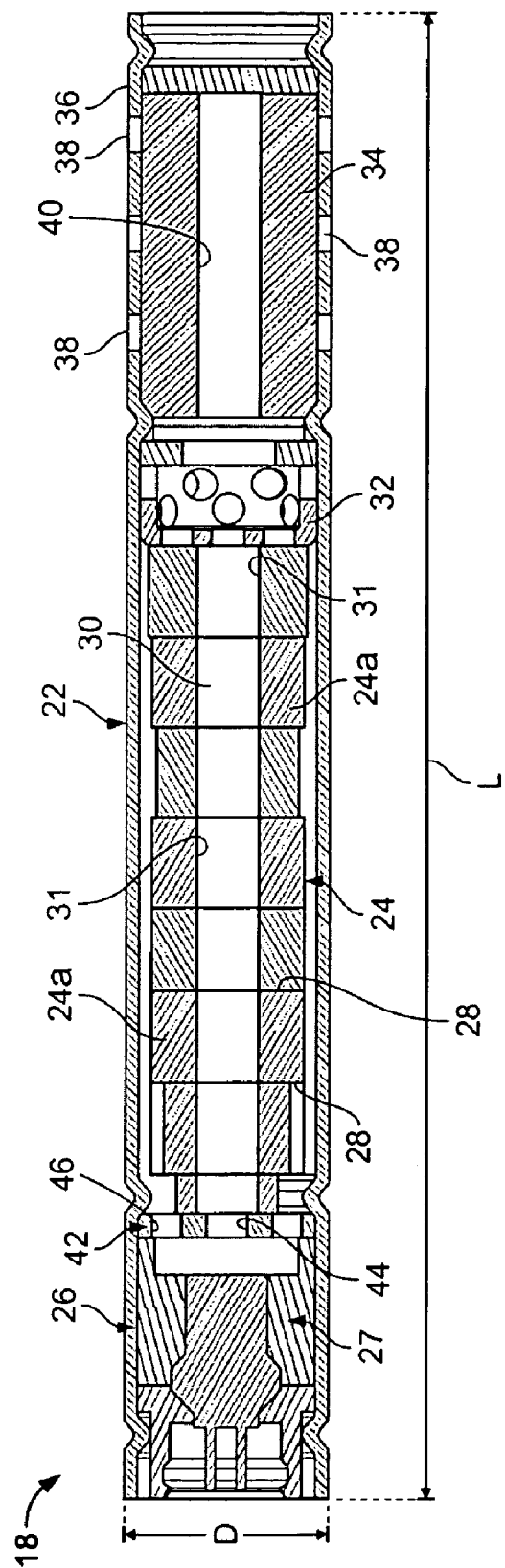
FIG. 2 is a cross-sectional view of an inflator for an airbag in accordance with the teachings of the present disclosure, the inflator drawn to scale.
Figure 4:
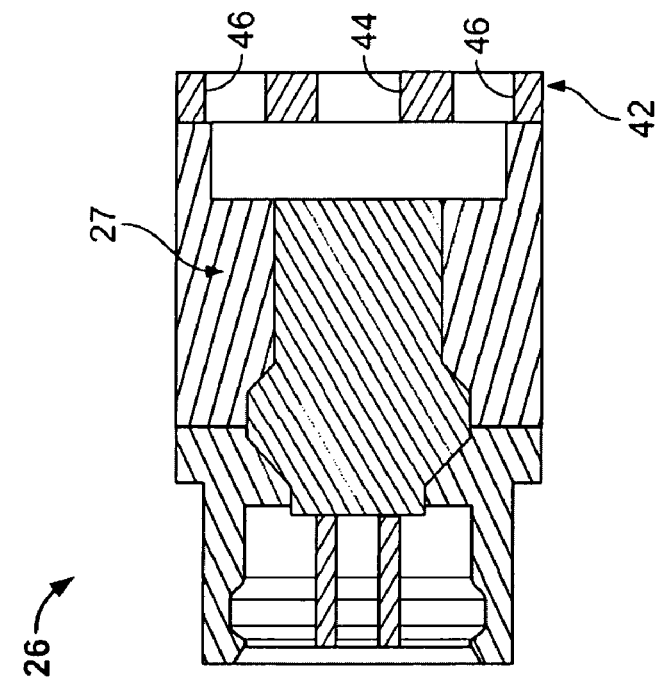
FIG. 4 is a cross-sectional view of the ignition distribution system of FIG. 3.
Figure 3:
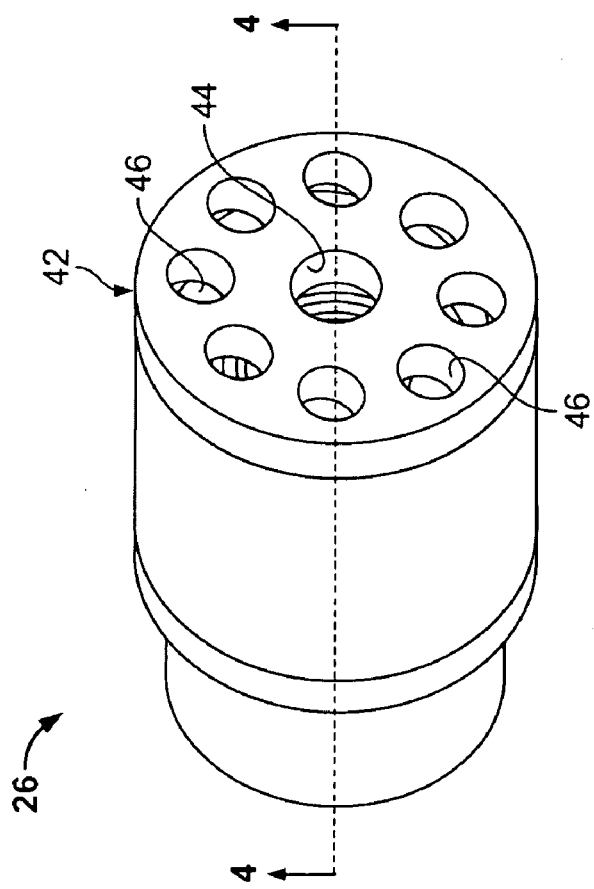
FIG. 3 is a perspective view of an ignition distribution system of the inflator of FIG. 2.

With continued reference to the environmental view of FIG. 1 and additional reference to FIGS. 2 through 4, the inflator 18 of the present teachings will be further described. Generally, the inflator 18 may be operative to create a rapidly expanding gas that can inflate the airbag 16 within milliseconds of detection of a predetermined event (e.g., impending vehicle rollover) of the motor vehicle 10 to enable the airbag 16 to inflate and create a barrier between occupant(s) of the motor vehicle 10 and the motor vehicle 10 itself, which may prevent or minimize injuries to the occupant(s). The inflator 18 may generally include a housing 22, a gas generant 24, and an ignition distribution system 26.

The housing 22 may be an elongated housing having a generally cylindrical cross section or other cross section of suitable geometry. In one particular application, the housing has a length L of approximately 100-200 mm and a diameter D of approximately 20-30 mm. It will be understood that the noted dimensions are merely exemplary and may deviate for different applications within the scope of the present teachings. In one particular embodiment, the housing may have a length of 150 mm and a diameter of 20 mm.

The distribution system 26 may be crimped into an end of the housing 22 in a conventional manner or otherwise suitably secured within the housing 22. The ignition distribution system 26 may generally include an actuator in the form of a pyrotechnic initiator 27. The initiator 27 is shown in simplified cross-sectional form throughout the drawings and may include any suitable initiator. One suitable initiator is shown and described in commonly assigned U.S. Pat. No. 7,210,703, which is hereby incorporated by reference in its entirety. As such, the exemplary initiator 27 will not be discussed in detail herein. Briefly, however, the initiator 27 may include a reactive charge, a pair of conductive pins and a bridgewire (not specifically shown). The squib can produce a detonation or ignition charge upon receipt of a signal, such as an electrical current, as will be discussed. The reactive charge may be in communication with the gas generant 24. The reactive charge may also be in communication with and responsive to the squib to ignite upon receipt of the charge from the squib.

One of the conductive pins may be isolated from the squib, while the other conductive pin may be coupled to the squib. The bridgewire can connect the first conductive pins. Additional reactive charge can also be packed about the bridgewire, if desired. Upon receipt of a signal, an electrical current may be introduced to the pins. The signal may be indicative of an impending collision or other vehicle event in which inflation of the cushion 20 is desired, for example. The introduction of the electric current may cause the squib to fire, and produce an ignition charge, which in turn, may ignite the reactive charge. Sensing of the vehicle event and the transmission of the corresponding signal to the initiator 27 will be understood to be conventional insofar as the present teachings are concerned.

The gas generant 24 may include one or more discrete elements 24a. The discrete element(s) 24a may be disposed within the housing 22 in a predetermined orientation. In this regard, the element(s) 24a of the gas generant 24 are not pellets which are randomly disposed within the housing 22. Rather, the discrete element(s) 24a may be particularly oriented within the housing 22 to more effectively tune performance characteristics of the inflator 18.

In certain applications, the gas generant 24 comprises a monolithic gas generant grain. Examples of suitable gas generants are described in commonly owned U.S. Ser. No. 11/472,260 filed 21 Jun. 2006, which is hereby incorporated by reference as if fully set forth herein. It will be understood, however, that another gas generant may be employed within the scope of the present teachings.

The gas generant 24 may be generally cylindrical or of any other desired shape. Each of the discrete element(s) 24a may include a first and second parallel side or end face 28. One of the first and second end faces 28 may be oriented to face toward the initiator 27. Each of the element(s) 24a may further include a bore 30 passing therethrough. The bore 30 may generally be formed or defined about a longitudinal axis defined by the discrete element(s) 24a. The discrete element(s) 24a may be stacked within the housing 22 such that the respective bores 30 substantially align. The bores 30 may have any desired shape, but may generally have a circular cross section defined by a sidewall 31. In addition, the bores 30 may be of any suitable size to enable a desired ignition and a desired rate of gas generation. As an example, the bores 30 may have a diameter from about 4.5 millimeters to about 7.0 millimeters. The gas generant 24 may be held in place with a plug 32. The plug 32 may be conventional insofar as the present teachings are concerned. Briefly, the plug 32 may include a plurality of apertures for the passage of inflation gas.

The inflator 18 may additionally include a conventional filter 34. The filter 34 may be mounted in an end 36 of the housing 22. As shown, the end 36 may be crimped to retain the filter 34. The end 36 of the housing 22 may include a plurality of openings 38 for venting the inflation gas from the housing 22 to the cushion 20. In this regard, the inflation gas passes from a central opening 40 of the filter 34, through the filtering media of the filter 34 and out the plurality of openings 38.

The distribution system 26 may further include a distributor 42 disposed between the initiator 27 and the gas generant 24. The distributor 42 may be generally cylindrical in shape and may define at least two distinct flow paths for distributing the source of energy produced by the initiator 27 to the gas generant 24. The at least two distinct flow paths may include a central opening 44 and a plurality of secondary openings 46 positioned radially relative to the central opening 44. The central opening 44 may be larger than the secondary opening 46. In one particular application, the central opening 44 may have a diameter approximately 5 mm and the secondary openings 46 may have a diameter of approximately 3 mm. The central opening 44 may be disposed relative to the gas generant 24 to direct the source of energy to a first surface of the gas generant 24 defined by the sidewall 31 of the bore 30. The secondary openings 46 may be oriented relative to the gas generant 24 to direct the source of energy to a second surface comprising the end face 28 of the adjacent discrete element 24a of the gas generant 24.

Figure 5:
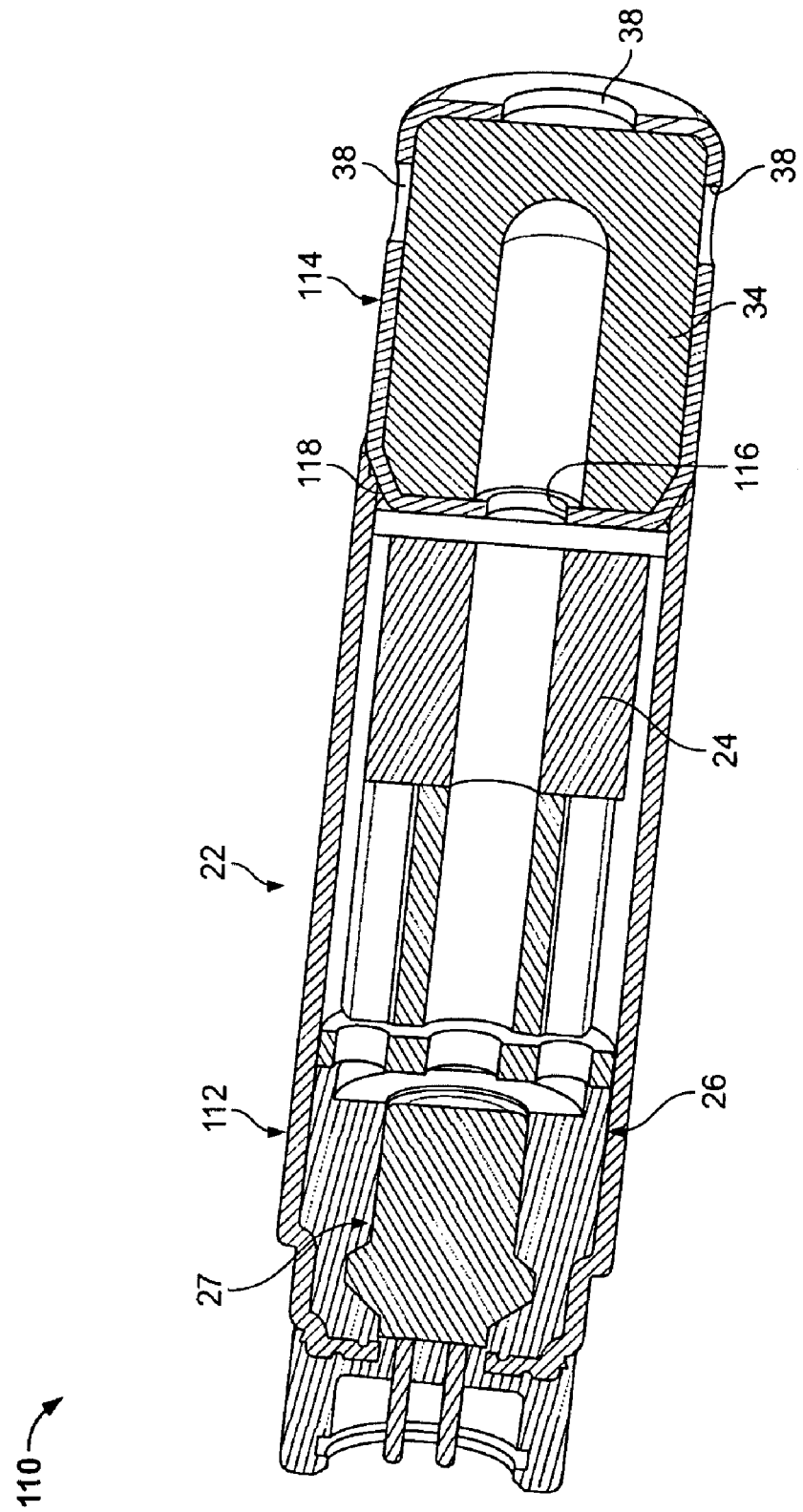
FIG. 5 is a cross-sectional view of another inflator for an airbag in accordance with the teachings of the present disclosure, the inflator drawn to scale.

Turning to the cross-sectional view of FIG. 5, another inflator in accordance with the present teachings is illustrated and identified at reference character 110. Given the similarities between the inflator 18 and the inflator 110, like reference numerals will be used to identify similar elements. The inflator 110 differs from the inflator 18, for example, in that the housing 22 includes a plurality of modular components.

In the embodiment illustrated, the plurality of modular components of the housing 22 may include first and second stampings 112 and 114. The first stamping 112 may be a combustion chamber stamping into which the initiator 27 may be directly molded. The first stamping 112 may be a polymer. In this manner, conventional crimping and sealing of the initiator end of the housing 22 may be effectively eliminated.

The second stamping 114 may be a cooling chamber stamping. The cooling chamber stamping 114 may be formed to include an orifice 116 sized for controlling combustion pressure. The cooling chamber stamping 114 may further include a stepped wall 118 to accommodate a resistance weld of the cooling chamber stamping 114 to the combustion chamber stamping 112.

A hermetic seal (not shown) may be provided over the orifice 116 in the form of a foil tab prior to resistance welding of the housing stampings 112 and 114. The filter 34 may be held in place in the cooling chamber stamping 114 with a roll crimp. Hermetic sealing of the openings 38 is not required. Modular construction of the housing 22 provides for simplified hermetic sealing of the inflator 110 and a reduction in manufacturing steps. To the extent not otherwise described, the construction and operation of the inflator 110 will be understood to be identical to the description provided above for the inflator 18.

It will now be apparent that the present teachings provide for an arrangement for efficiently directing a single source of energy toward the gas generant 24. Performance characteristics of the inflators 18 and 110 may be modified through changes to the gas generant 24 and the openings 44 and 46 in the distributor 42, for example.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. An inflator for an airbag of a motor vehicle, the inflator for an airbag comprising:
   a housing;
   a gas generant for producing a source of inflation gas, the gas generant including a central opening extending therethrough and defined by an internal sidewall, the gas generant disposed in the housing in a predetermined orientation such that an external longitudinal sidewall of the gas generant is spaced apart from the housing;
   an initiator disposed in the housing for producing a source of energy to ignite the gas generant; and
   a distributor disposed between the initiator and the gas generant, the distributor defining at least first and second distinct flow paths for distributing the source of energy to the gas generant, the first distinct flow path oriented relative to the gas generant to direct the source of energy to the central opening and internal sidewall of the gas generant, the second distinct flow path oriented relative to the gas generant to direct the source of energy to the external sidewall of the gas generant independent of the first distinct flow path and central opening.

2. The inflator for an airbag of claim 1, wherein the distributor is generally cylindrical.

3. The inflator for an airbag of claim 1, wherein the distributor includes a generally central opening defining the first flow path.

4. The inflator for an airbag of claim 3, wherein the distributor further includes a plurality of secondary openings equally radially oriented relative to the central opening.

5. The inflator for an airbag of claim 4, wherein the plurality of secondary openings are oriented relative to the gas generant to direct the source of energy to an end face and the external sidewall of the gas generant, and wherein the gas generant includes a monolithic gas generant grain.

6. The inflator for an airbag of claim 1, in combination with the airbag.

7. An inflator for delivering a source of inflation gas to a side airbag of a motor vehicle, the inflator comprising:
   an elongated housing, the housing having a generally cylindrical cross section;
   a gas generant for producing the source of inflation gas, the gas generant including first and second generally planar sides, an opening extending therethrough defined by an internal sidewall, and an external longitudinal sidewall generally opposite the internal sidewall, the gas generant disposed in the housing in a predetermined orientation with the external longitudinal sidewall of the gas generant spaced apart from the housing;
   an initiator disposed in the housing for producing a source of energy to ignite the gas generant; and
   a distributor disposed directly between the initiator and the gas generant so as to abut the initiator and the gas generant, the distributor including a main opening for directing the source of energy along a first distinct flow path to the opening of the gas generant, the distributor further including at least one secondary opening for directing the source of energy along a separate second distinct flow path to one of the first and second planar sides and the external longitudinal sidewall of the gas generant.

8. The inflator for an airbag of claim 7, wherein the at least one secondary opening includes a plurality of secondary openings.

9. The inflator for an airbag of claim 8, wherein the plurality of secondary openings radially surround the main opening and are each equally spaced from the main opening.

10. The inflator for an airbag of claim 7, wherein the elongated housing includes a first housing section separately formed and secured to a second housing section.

11. The inflator for an airbag of claim 7, wherein the initiator is molded into an end of the housing.

12. The inflator for an airbag of claim 7, in combination with the side airbag.

13. The inflator for an airbag of claim 7, wherein the gas generant is a monolithic gas generant grain.

* * * * *